Patented Dec. 4, 1951

2,577,624

UNITED STATES PATENT OFFICE 2,577,624

MINERAL-COATED PAPER AND PROCESS OF PRODUCING SAME

George E. Niles, Winchester, Mass., assignor to Monsanto Chemical Company, St. Louis, Mo., a corporation of Delaware No Drawing. Application March 29, 1947, Serial No. 738,227

7 Claims. (Cl. 117—155)

This invention relates to improved mineral or pigmented coated paper, and in particular relates to paper having high brightness, high gloss and good affinity for printing inks. It involves the use of a coating composition not hitherto associated with glossy printing paper.

For the reproduction of fine half-tone cuts, an important criterion is that the surface printed upon shall be very level. Supercalendered mineral-coated paper is the stock generally employed for such printing purposes. By the term "mineral-coated paper" is meant paper comprising a fibrous base having on one or both surfaces a continuous layer of mineral or pigment composition which covers the fibers of the base and fills the hollows between the fibers on the surface of the base, so that when the paper is calendered, it has a smooth, even and continuous surface. The mineral coating composition is applied to the paper in the form of an aqueous suspension. However, unless the pigment or mineral coating is suitably bonded to itself and the paper fibers, it will rub off, particularly if the coated paper surface is slightly moist. It is also necessary that the coated paper has good receptivity or affinity for ink, and that the ink sets satisfactorily, that is, in a relatively short time. Commonly employed pigments are clay, calcium carbonate, blanc fixe, talc, titanium dioxide and the like.

As a pigment binder for the pigment there has been employed generally heretofore starch or casein. However, the use of either starch or casein as a pigment binder for coated paper leaves much to be desired. Thus, the use of starch provides a paper having poor water-resistance. Again, starch loses much of its binding ability on calendering of the paper. The use of casein as a pigment binder presents the objectionable feature that the casein itself varies in composition, with a resultant variation in the composition of the coated paper on which it is employed. It is also open to the objection of loss of binding ability on calendering of the paper.

By the use of the compounds of the present invention, the binding ability not only is maintained with continued calendering, but it has been discovered that less calendering of the paper is necessary where they are employed. Due to this ease of calendering there is less loss of brightness with an accompanying improvement in the quality of the paper. Likewise, since less calendering is necessary, the cost of production is less. Furthermore, since less calendering is required, cheaper grades of paper pulp can be employed in the base sheet to maintain equivalent strength.

In accordance with this invention there has been provided a new binder for pigmented or mineral-coated papers, by the application of which, paper having improved characteristics is obtained.

An object of this invention is to provide a new pigment binder for use in pigmented or mineral-coated papers.

Another object is to provide an improved coating for paper.

A further object is to provide an improved coated paper.

A further object is to provide an improved process for coating paper.

Other and further objects will be apparent as hereinafter shown.

In accordance with this invention there is employed as the binder for the pigment in the paper coating composition a styrene-maleic anhydride copolymer, the term "a styrene-maleic anhydride copolymer" including its various derivatives. More particularly the water-soluble derivatives such as its alkali or ammonium salt, its half-amide or ammonium salts thereof are preferred. These products may be suitably prepared by copolymerizing preferably substantially equi-molecular weights of styrene and maleic anhydride by a convenient method well-known in the prior art, and then if desired, converting to the appropriate derivative. The salts may be prepared by treatment of the copolymer with suitable bases such as the alkalies or ammonia and the amide prepared by suitably treating the copolymer with anhydrous ammonia or an amine. The amide may then be converted to the desired salt.

The resinous compounds so obtained are suitably incorporated together with a pigment such as clay, talc, blanc fixe and the like in a medium such as water and applied to a coating raw stock by suitable means such as for example, by means of an air knife or roll coating coater.

The styrene-maleic anhydride as employed according to the present invention may be prepared by any of the processes well-known to those skilled in the art. Thus, it can be made by polymerization of a mixture of substantially equi-molecular weights of monomers in a solvent such as acetone; by mass polymerization where maleic anhydride is dissolved in the styrene monomer in the ratio of substantially equi-molecular weights and polymerization effected preferably in the presence of a catalyst; again, other well-known processes may be employed.

Furthermore, it has been found that a styrene-maleic anhydride formed by copolymerizing substantially equi-molecular weights of the monomers and having a molecular weight characterized by a viscosity of 5 to 30 centipoises at 25° C. in a 0.2% aqueous solution adjusted to pH of 5.5–5.6 with NaOH, is the most satisfactory for use as a pigment binder or for use as an intermediate in preparing a pigment binder according to this invention.

In the examples herein the styrene-maleic anhydride copolymer employed was prepared in the following manner:

Substantially equi-molecular proportions of styrene and maleic anhydride were heated for substantially four hours in benzene at 100° C. under a slight pressure in the presence of 0.25% benzoyl peroxide catalyst based on the combined weight of the two monomers. The weight ratio of styrene plus maleic anhydride to solven was 10% so that after the reaction an approximate 10% slurry of styrene-maleic anhydride copolymer was obtained. After the reaction was complete, the slurry was filtered and the filter cake dried in a vacuum drier. A 0.2% aqueous solution of the products so obtained with the pH adjusted to 5.5–5.6 with NaOH had a viscosity at 25° C. of 6.8 centipoises.

The following are given by way of specific examples but are not to be understood as limitative of the scope of this invention.

Example I

A clay slip at 70% solids had added to it an amount of sodium salt of styrene-maleic anhydride copolymer equal to 10% on the clay as a 10% resin solution. Additional water was added to give a 33% solids coating color. The coating was applied to a coating raw stock by means, for example, of an air knife coater or a roll coating coater. After application, the sheet was supercalendered to such a gloss as is required by the industry. The paper so coated was dried, calendered and tested for pick by method of the "Technical Association of Pulp and Paper Industry," standard T–459m–45 and found to be most satisfactory for printing purposes. The treated sheet also provided a surface with sufficient web rub for offset lithography. By the term "wet rub" as used in the present application is meant the simple test, well-known in the paper art, where a finger is moistened and rubbed over the paper surface. If the coated surface becomes slimy, or washes off, the wet rub test demonstrates an unsatisfactory product. If the paper surface remains intact a satisfactory product is indicated. This simple test is highly effective in evaluating binders for pigmented coatings. Calendering was also easily effected.

Example II

A clay slip at 70% solids had added to it an amount of ammonium salt of styrene-maleic anhydride copolymer equal to 10% on the clay as a 10% resin solution. Additional water was added to give a 33% solids coating color. The coating was applied to paper as in Example I and tested for pick by the method of "Technical Association of Pulp Paper Industry," standard T–459m–45 and found to be satisfactory for printing purposes. The wet rub was quite satisfactory. Calendering was easily effected.

Example III 50 parts by weight of styrene-maleic anhydride copolymer were slurried in about 395 parts by weight of benzene and a small excess over the amount of anhydrous ammonia required to prepare the half amide added slowly thereto. An exothermic reaction took place. Agitation was effected for about 20 minutes after the ammonia was added, and the insoluble product filtered off and dried. 25 parts by weight of the solid were dissolved in 218 parts by weight of water and 7 parts by weight of 28% aqueous ammonium hydroxide and the solution of the ammonium salt so formed incorporated with a clay slip as set forth in Example I. On applying the coating and testing in the manner described in Example I, it was found to have good pick and also high wet rub properties.

Example IV 25 parts by weight of styrene-maleic anhydride copolymer, about 198 parts by weight of dry benzene and 13 parts by weight of freshly distilled aniline (10% excess over that required to form the half amide) were placed in a suitable reactor equipped with a reflux condenser and heated with agitation for about one hour at a temperature of about 65° C. and allowed to stand over night. The product was filtered off, washed with fresh benzene and dried. The dried solid was converted to the ammonium salt and incorporated with a clay slip as in Example I. On applying the coating and testing in the manner described in Example I, it was found to have a satisfactory wet rub.

Example V 25 parts by weight of styrene-maleic anhyrdide copolymer, about 264 parts by weight of dry benzene and 10.5 parts by weight of n-butyl amine (10% excess over that required to form the half amide) were placed in a suitable reactor and agitated until the exothermic reaction was cooled to room temperature, after which the solid amide of the styrene-maleic anhydride copolymer was filtered off, washed with fresh benzene and dried. The dried solid was converted to the ammonium salt and incorporated in a clay slip as in Example I. On applying the coating and testing in the manner described in Example I, it was found to have a satisfactory wet rub.

Example VI

An amide has also been prepared from a styrene-maleic anhydride copolymer and ortho amino diphenyl. This amide was converted to the ammonium salt and incorporated in a clay slip as in Example I. On applying the coating and testing in the manner described in Example I, it was found to have good pick and excellent wet rub properties.

By the use of the resins of this invention, there is produced a level coating which requires less calendering than is required by the employ of starch or casein. Thus, where starch or casein is employed as a pigment binder, six to ten supercalender nips are necessary to achieve the required gloss or finish. Where the resins of this invention are used, only four to six nips are necessary to achieve the required gloss or finish. It is also to be noted that the coatings employ the resins of this invention do not "dust" or flake off on calendering as do starch and casine. Thus, it is readily apparent that a marked advance has been achieved by the process of this invention in the coating of papers with pigmented coatings.

Of course, other ratios of the compounds of this invention than those specifically shown may be employed in practicing this invention. Thus, from about 5% to 30% of the weight of the mineral or pigment may be conveniently used.

What is claimed is:

1. The process of producing a mineral-coated printing paper of high brightness and having excellent ink receptivity which consists in coating at least one side of a paper body stock suitable as a base for printing papers with a coating color consisting essentially of water, a mineral pigment and from 5 to 30% by weight on the pigment of a water-soluble salt of styrene-maleic anhydride copolymer, said pigment being supplied in an amount sufficient to provide the major portion of the solids content of said coating color, said copolymer being characterized in that a 0.2% aqueous solution thereof adjusted to a pH of 5.5 to 5.6 with NaOH has a viscosity of 5 to 30 centipoises at 25° C. and then drying and calendering the coated paper stock until the coating on the coated stock has a smooth and continuous surface.

2. The process substantially as described in claim 1, but further characterized in that the water-soluble salt of the copolymer is an alkali-metal salt.

3. The process substantially as described in claim 1, but further characterized in that the water-soluble salt of the copolymer is a sodium salt.

4. The process substantially as described in claim 1, but further characterized in that the water-soluble salt of the copolymer is an ammonium salt.

5. The process substantially as described in claim 1, but further characterized in that the water-soluble salt is the ammonium salt of the half amide of the copolymer.

6. The process of producing a mineral-coated printing paper of high brightness and having excellent ink receptivity which consists in coating at least one side of a paper body stock suitable as a base for printing papers with a coating color consisting essentially of 67% water and 33% solids which consist of a mineral pigment and 10% on the weight of the pigment of a water-soluble amonium salt of styrene-maleic anhydride copolymer, said copolymer being characterized in that a 0.2% solution thereof adjusted to a pH of 5.5 to 5.6 which NaOH has a viscosity of 5 to 20 centipoises at 25° C.; and then drying and calendering the coated paper stock until the coating on the coated stock has a smooth and continuous surface.

7. A paper sheet coated on at least one surface thereof with a calendered coating consisting essentially of particles of mineral pigment and from 5 to 30% by weight, based on said pigment, of a salt of styrene-maleic anhydride copolymer, which copolymer has a molecular weight such that a 0.2% aqueous solution thereof adjusted to a pH of 5.5 to 5.6 with NaOH has a viscosity of 5 to 30 centipoises at 25° C., said coating having a smooth and continuous surface which is receptive to ink and being further characterized in that the particles of mineral pigment therein are bound to each other and to the surface of the paper sheet by said salt of the copolymer.

GEORGE E. NILES.

REFERENCES CITED

The following references are of record in the file of this patent:

UNITED STATES PATENTS

| Number | Name | Date |
|---|---|---|
| 1,976,679 | Fikentscher et al. | Oct. 9, 1934 |
| 1,982,018 | Owen | Nov. 27, 1934 |
| 2,047,398 | Voss et al. | July 14, 1936 |
| 2,230,240 | Gerhart | Feb. 4, 1941 |
| 2,286,062 | Condo et al. | June 9, 1942 |
| 2,313,565 | McDowell et al. | Mar. 9, 1943 |
| 2,356,879 | Pense et al. | Aug. 29, 1944 |
| 2,399,489 | Landes | Apr. 30, 1946 |
| 2,430,313 | Vana | Nov. 4, 1947 |
| 2,456,177 | Cupery | Dec. 14, 1948 |
| 2,469,409 | Powers et al. | May 10, 1949 |
| 2,486,804 | Seymour et al. | Nov. 1, 1949 |

OTHER REFERENCES

Ser. No. 397,138, Fikentscher (A. P. C.), published May 11, 1943.